United States Patent [19]
Czoch et al.

[11] 4,359,152
[45] Nov. 16, 1982

[54] PRODUCTION LINE FLOW CONTROL

[75] Inventors: Jerzy W. Czoch; Douglas J. W. Seagrove; Robert J. Green; Martin D. Morgan, all of London, England

[73] Assignee: Molins, Ltd., London, England

[21] Appl. No.: 879,878

[22] Filed: Feb. 22, 1978

[51] Int. Cl.³ .............................................. B65G 43/08
[52] U.S. Cl. .................................. 198/572; 198/575; 198/607
[58] Field of Search ...................... 198/347, 571–573, 198/575, 577, 579, 604, 606, 607, 855, 856, 601; 131/21 R, 21 B, 21 C, 25, 282, 283, 909

[56] References Cited
U.S. PATENT DOCUMENTS
4,099,608 7/1978 McCombie ........................ 198/347

FOREIGN PATENT DOCUMENTS
2621564 12/1976 Fed. Rep. of Germany ...... 198/347

Primary Examiner—Joseph E. Valenza
Attorney, Agent, or Firm—Antonelli, Terry & Wands

[57] ABSTRACT

Conveyor control circuit for use at a junction of conveyors at which articles move from one conveyor to another or between a number of conveyors. Speed signals from conveyors whose speeds are dictated by conditions elsewhere in the system are summed to produce a "net flow signal" which is preferably corrected by the addition of a signal from a sensor at the junction, whose sensitivity may be adjusted in accordance with the net flow signal so that the correction is greater when the net flow towards or away from the junction is greater. The controlled conveyor may be used to move articles to or from a reservoir device. Additional speed correction may be applied if the sensor signal is outside a range which varies in size with the net flow signal.

11 Claims, 8 Drawing Figures

PRODUCTION LINE FLOW CONTROL

This invention relates to the control of manufacturing processes in which cigarettes or other similar rod-like articles issuing at high speeds from article making machines are subsequently distributed to packing machines, in a continuous or semi-continuous flow, and in which the rates of production and/or packing vary from time to time as individual machines are periodically taken out of service or slow down, or as articles are rejected as faulty. Arrangements of this kind including a number of making machines and a number of packing machines are common in the cigarette-making industry and the invention will be described with particular reference to the manufacture of cigarettes, but it will be understood that it is equally applicable to other products.

When a system including a number of making machines linked by cigarette conveyors to a number of packing machines is in operation, disparities frequently occur between the number of satisfactory cigarettes produced, and the capacity of the packing machinery to pack them. For this reason it is normal to provide reservoir devices such as the Molins "OSCAR" to act as a buffer store between the makers and the packers, to take in cigarettes when the making capacity is greater than the packing capacity (e.g. when a packing machine is out of service) and to return them to the system when the packing capacity is greater (e.g. if a maker stops or if a large number of cigarettes are rejected on issuing from a maker, because of faults).

When the system includes only one or more makers and a number of packers, reasonable control of the distribution of the cigarettes to the packer can be achieved in a relatively simple manner. Sensors are positioned at various points in the flow path, such as at junctions where the reservoir devices are connected into the system. If an excess of cigarettes is detected, the cigarettes are taken into the reservoir devices, or if a shortfall is detected they are fed back into the system, and this is usually achieved simply by changing the direction of a conveyor linking the junction to the reservoir.

However when a large number of makers and packers are connected together it becomes difficult to avoid complex interactions between the conveyors which result in disturbance in the flow being transmitted around the system; this can cause long-term instability and make it difficult to maintain a smooth flow of cigarettes. This seems to be partly due to the fact the cigarettes take an appreciable time to travel from one sensor point to the next, so a disturbance in the flow at one point is not detected at the next point until some time later—when it may clash with a new disturbance at the second point.

Our co-pending application British No. 20962/75 (and corresponding German Offenlegungsschrift No. 26 21 564 and United States patent application Ser. No. 685,535) discloses a conveyor system comprising means defining a junction zone; at least two cigarette conveyors each arranged to feed cigarettes to or from the junction zone; a first drive means for driving one of the conveyors; a second drive means for driving another of the conveyors; control means for controlling speed of the second drive means whereby the second drive means runs at a speed which, as long as other factors determining the flow of cigarettes to or from the junction zone remain constant, is basically predetermined in relation to the speed of the first drive means; a sensor responsive to the volume or pressure of cigarettes in the junction zone and arranged to control a speed-regulating mechanism associated with the second drive means, whereby the speed of the second drive means is changed from the basically predetermined value in response to the volume or pressure within predetermined limits.

A conveyor system according to one aspect of the present invention comprises a plurality of junction zones, each junction zone comprising at least an "upstream" and a "downstream" conveyor arranged to normally feed cigarettes respectively to and from the junction zone, one of which is to be controlled in accordance with the flow conditions; separate drive means connected to each of the conveyors; a sensor at each junction, responsive to the volume or pressure of cigarettes in the junction zone; and control circuit means adapted to combine a net flow signal dependent upon the flow of cigarettes upstream and/or downstream of the junction with a correction signal from the sensor to produce a control signal determining the speed or the speed and direction of the conveyor which is to be controlled.

Normally, that is when there are no unusual disturbances in the system, the sensor will be in an equilibrium position in which it preferably has little or no effect and the control signal will therefore comprise the algebraic sum of the flow input signals. The sensor preferably acts as an error correction device in that it senses any variations from the desired conditions in the junction and "feeds back" a suitable compensating signal to the control circuit.

By "upstream of the junction" in this context we mean a region from which cigarettes flow to the junction, either from a conveyor line which is being fed from one or more makers, or directly from a maker, or from a line downstream of any other devices which are feeding cigarettes to or taking them from the line in such a way that there is normally a net flow to the junction in question, and it will be understood that where there are a number of makers connected to a common line the first signal will generally be related to the sum of their operating speeds. Similarly the "downstream" direction is the direction in which surplus cigarettes (if any) will normally flow away from the junction, although it will be appreciated that if there is a reservoir device downstream, the cigarettes may also be returned to the junction from this direction.

According to a further aspect of the present invention there is provided a control circuit for a conveyor in an article conveyor system including a junction at which the said conveyor meets at least one other conveyor, the said circuit comprising, means for producing a signal representing the net flow of articles towards or away from the junction on the other conveyor or conveyors; a sensor circuit arranged to produce a signal dependent upon the deviation of the number or level of articles in the junction from a desired number or level; means for altering the sensitivity of the sensor circuit in accordance with the net flow signal, and means for controlling the motor of the said conveyor at a speed proportional to the sum of the net flow signal and the sensor signal.

The circuit is preferably arranged in such a way that it can respond to a change of direction of one of the conveyors or other devices providing the input signals.

Thus if the normal flow to the junction should suddenly become a flow away from the junction, for example because it is necessary to reverse one of the upstream conveyors to clear a fault, the control circuit will still control the downstream conveyor in a suitable fashion for example by changing its direction so that it feeds cigarettes to the junction at a suitable rate instead of taking them away. In this way, even in a multi-junction system, proper stacking conditions can be maintained throughout the system, with cigarettes being automatically drawn from the reservoir devices, if necessary, to maintain uniform stacks in all the conveyors and junctions, so that "voids" and the possibility of any jams are prevented.

It will thus be apparent that it may be necessary in a large and complex system to provide an arrangement in which signals indicative of the flow rate at various points in the system are capable of being distributed to, and are compatible with, the control circuits of conveyors at junctions at various other points. In a large cigarette manufacturing plant it is quite common for the various individual mechines to be run off different electrical supply circuits, for example they may be connected to different phases of a 3-phase supply in order to spread the electrical load. Thus it could be dangerous to directly connect a speed-signal generating device on one machine to the control circuit of another machine or conveyor.

According to a further aspect of the invention, therefore, there is provided a control signal distribution system for an arrangement of interlinked making and packing machines of the type described above, comprising: means for generating a d.c. signal whose amplitude is related to a flow rate of articles; means for generating an a.c. carrier signal and modulating it by the d.c. signal; and isolating coupling means for connecting the modulated a.c. signal to the input of at least one control circuit of a conveyor.

Preferably a pair of transformers are used as the coupling means, one of which carries a reference signal, derived from the a.c. "carrier wave", and the other of which carries the modulated a.c. signal, so that the modulated signal and the carrier can be compared in a suitable detector circuit to provide an indication of the sense as well as the magnitude of the incoming control signal.

It is preferred to use isolating transformers as the coupling means because each such transformer can be provided with a number of independent secondaries so that it can supply mutually isolated control signals to a number of control circuits. Preferably an amplifier is provided in the primary circuit of the transformer to ensure that a sufficient signal level can be supplied to each of the individual control circuits.

Preferably the a.c. carrier signal is at a frequency of about 1 Khz and it is preferably amplitude modulated by the d.c. signal. In this latter case the sense of the incoming control signal is preferably determined by inter-connecting the secondaries of the pair of transformers via a phase sensitive detector in such a way that the rectified output from the detector changes polarity with the incoming control signal.

In the case of a simple junction in which a cigarette elevator is fed by two conveyors, it may be preferable to provide a simplified control system. For example such a control system may be used to combine the flows from more than one cigarette making machine, when the makers are significantly slower than the machines which they are feeding. For this purpose a conveyor-elevator "inverted T-junction" arrangement of the kind shown, for example, in FIG. 5 or FIG. 6 of our copending British application No. 52473/76 (and corresponding German Offenlegungsschrift 27 55 599 and United States application Ser. No. 859,708) may be used. That application describes in particular an arrangement whereby, if a void or recess occurs in the flow of one of the conveyors feeding to the elevator, the elevator may be controlled to run at half-speed until the void is filled.

It may however be necessary to provide smoother, i.e. continuously variable speed control to the elevator and thus according to a further feature of the present invention there is provided a control system for an elevator fed by a pair of conveyors carrying cigarettes from making machines, comprising means for forming a stack of cigarettes at the input to each conveyor; a conveyor control circuit including a transducer operating on each stack and adapted to provide a speed control signal for each conveyor proportional to the height of the corresponding stack, a summing amplifier arranged to produce an output proportional to the sum of the said conveyor speed control signals, and a motor control circuit for the elevator which is arranged to control the speed of the elevator in accordance with the sum of the conveyor speed control signal. Preferably, isolating coupling means are provided in the circuit between each transducer and the corresponding input of the summing amplifier.

Since inspection facilities may be provided for each making machine on each conveyor downstream of its stack former, whereby a handful of cigarettes may be removed from the conveyor to enable their quality to be visually checked, voids may occur in this part of the flow. Preferably therefore, there are also provided stack detection means for each conveyor, downstream of the inspection station, connected to the corresponding input side of the summing amplifier and arranged to provide a zero input in place of the corresponding stack-height signal, if a void should be detected. Thus the elevator will slow down for the duration of such a condition.

Some embodiments of the invention will now be described by way of example with reference to the accompanying drawings, in which.

Figure 1:
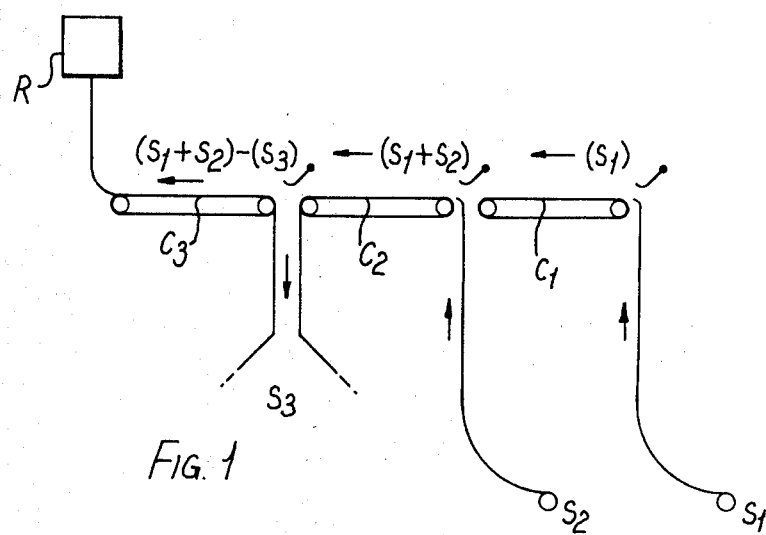
FIG. 1 is a schematic diagram of a cigarette production line.

FIG. 1 shows a production line comprising two cigarette making machines $S_1$ and $S_2$ feeding a packing machine $S_3$ via conveyors $C_1$ and $C_2$, and a reservoir device R connected to the system via a third conveyor $C_3$ to absorb any excess production which the packer may not be able to handle. It will be clearly appreciated from the drawing that if the two makers are supplying cigarettes to the production line at constant rates of S1 and S2 cigarettes per minute, the speeds of conveyors $C_1$ and C$_2$ must correspond to (S1) and (S1+S2) cigarettes per minute respectively. Similarly if the packer is packing at a rate S3, the conveyor taking the surplus to the reservoir device must run at a speed corresponding to (S1+S2)−(S3).

In practice, however, because the machines do not run at constant speeds or indeed constantly, and also because some cigarettes are rejected as faulty before being packed, the conveyor speeds cannot be predetermined and it is necessary to vary their speeds in accordance with the actual rate of supply of cigarettes to the respective junctions. In a simple system this can be done by allowing sufficient space at each junction for the cigarettes to accumulate to a limited extent, and monitoring the level of cigarettes with a mechanical sensor, for example. If the level rises, the speed of a conveyor taking cigarettes away from the junction is increased and if the level falls, the conveyor speed is correspondingly reduced. However in order to achieve more accurate control it is preferable to utilise a control circuit of the kind shown in FIG. 2 at each junction.

This circuit is adapted to combine two speed signals, a first speed signal from a conveyor "upstream" of the junction and a second speed signal from a conveyor connected directly to a maker or packer, and also a level signal, to produce control signals for a third conveyor. The example shown is intended to control a conveyor connecting the junction to a reservoir device, but of course it will be appreciated that it could be employed, possibly with slight modifications, to control a conveyor connecting the junction to any other junction. In the case of a system of the kind shown in FIG. 1, there may of course be more than one "first signal" depending on the number of conveyors upstream of the junction.

Figure 2:
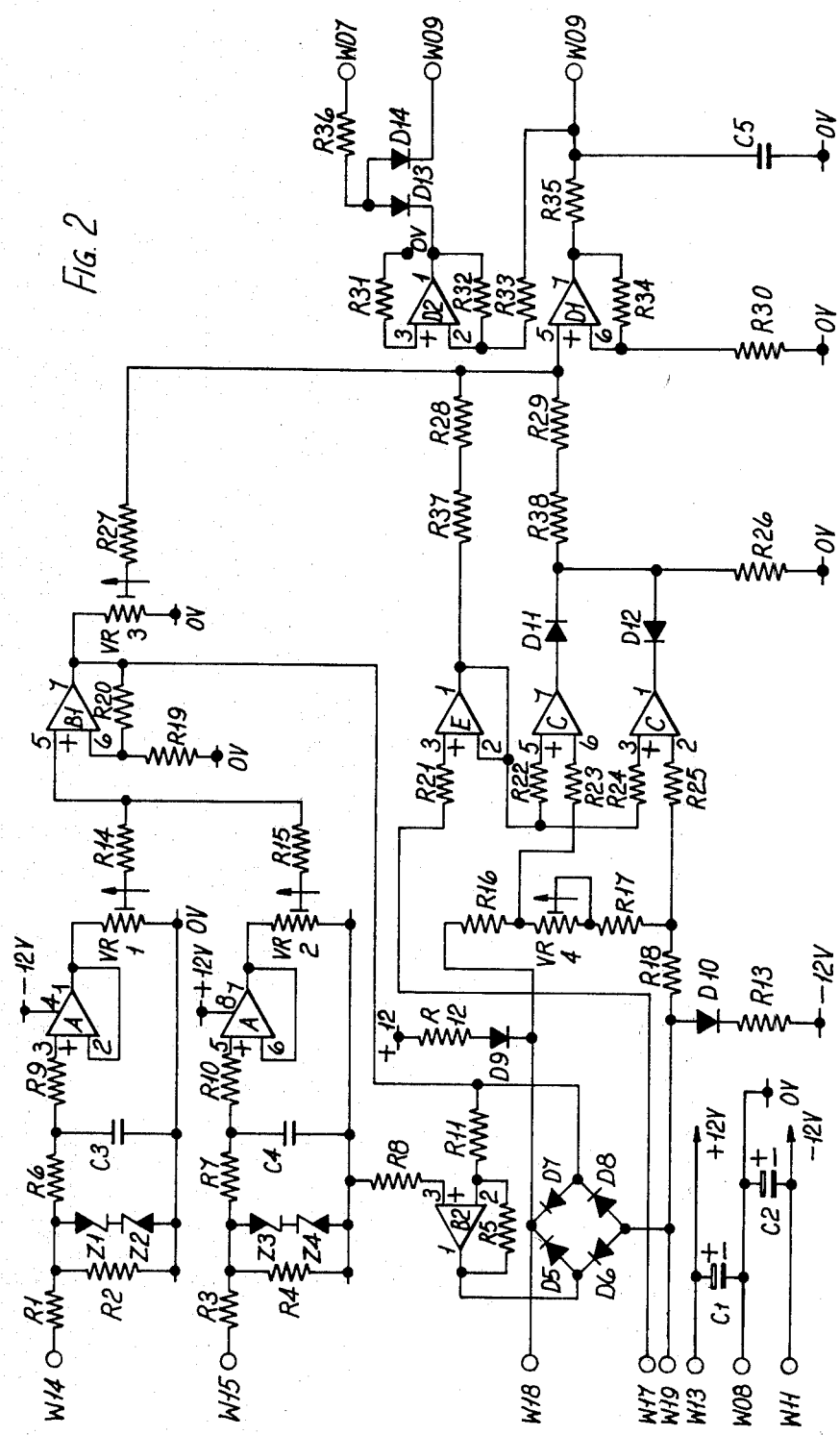
FIG. 2 is a circuit diagram of a conveyor speed control circuit.

The circuit of FIG. 2 operates as follows:

The first and second speed signals, from two tachogenerators, are supplied to W14 and W15. The signals are attenuated by networks R1 and R2, or R3 and R4, and filtered from any brush noise or ripple by networks R6, R9 and C3, or R7, R10 and C4 respectively. The signals are applied to voltage followers A.

Pairs of Zener diodes Z1 and Z2 and Z3 and Z4 prevent the inputs of the amplifiers becoming saturated if an excessive input is present; this could cause polarity reversal at the amplifier outputs.

Potentiometers VR1 and VR2 are used to adjust the proportion of each signal to the input of summing amplifier B1. The sum of the two signals is applied to a variable attenuator VR3, R27 and then connected to the input of another summing amplifier, D1.

The unattenuated output from B1, pin 7, is supplied directly to the junction of diodes D7, D8 of a diode bridge D5-D6-D7-D8 and also via an inverter, B2 to the junction of diodes D5, D6. This ensures that W18 is always positive with respect to W19 regardless of the polarity of B1 pin 7. The voltage across W18 and W19 is applied to the outer terminals of an external level-sensing potentiometer and the wiper thereof is connected to W17. The voltage across the potentiometer is thus proportional to the conveyor speeds, but at very low speeds the forward voltage drop of the diodes may be greater than the applied voltage. Biassing networks R12 and D9, and R13 and D10 provide sufficient bias to achieve correct operation at low speeds, and ensure that the circuit has sufficient output if "creep" of the conveyors should occur.

The output from the sensor potentiometer is connected to W17 and provides a voltage which exerts a corrective action on the conveyor. It is applied to a unity gain buffer E (R21 prevents damage to the sensor potentiometer in the event of failure of the amplifier) and the output in summed at the input of amplifier D1 via R37 with the output of B1 via VR3 and R27. The output of the amplifier D1 is applied through a filter R35 and C5 to WO5 to provide a field control signal for the output conveyor motor. This output is also applied to a unity gain inverting amplifier D2. The diodes D13 and D14 form a gating circuit which selects the negative signal from the two amplifiers D1 pin 7, D2 pin 1 (WO5 can be connected to WO9 by the contacts of a relay) and this is applied via R36 to WO7 to provide a speed signal in the reverse as well as the forward direction. When WO5 is disconnected from WO9 the motor is prevented from reversing.

The circuit also provides rapid correction in the event that the level of cigarettes detected is too low or too high, which works as follows when the controlled conveyor is moving forwards. The voltage across the diode network is applied to a resistor chain R16, VR4, R17 and R18. The junctions of R16 and VR4, R17 and R18 provide two reference voltages for the level detector circuit. The two references are applied to pin 6 and pin 2 of amplifiers C, via resistors R23 and R25. The output of E, pin 1 (which is the same voltage as the sensor potentiometer)—is connected to the two non-inverting inputs of the amplifiers via R22 and R24. When the voltage on the wiper of the potentiometer is greater than that at the junction of R16 and VR4, pin 5 becomes more positive than pin 6, giving a positive output on pin 7. D11 is forward biassed and the voltage is summed via R38 and R29 at the input of amplifier D1. At the same time pin 3 is more positive than pin 2 and D12 is reverse biassed. When the voltage on the wiper is lower than that at the junction of R17 and R18, pin 2 of C is more positive than pin 3 and the output on pin 1 falls towards the negative supply rail, forward biassing D12. This voltage is summed at the junction of R28, R29. Similarly pin 6 is more positive than pin 5 and the amplifier output switches towards the negative rail, reverse biassing D11. When the voltage at the wiper is between the two reference both amplifiers are switched so that the diodes D11 and D12 are reverse biassed and the output of the amplifiers has no effect upon the summing junction. When D11 is forward biassed the voltage at the input of the summing amplifier is increased thus causing the speed of the motor to be increased. When D12 is conducting the voltage at the input of the summing amplifier is reduced, decreasing the speed of the motor. Conversely when the controlled conveyor is moving in the reverse direction, the forward biassing of D11 causes the motor speed to be decreased whereas the forward biassing of D12 causes it to increase.

By way of example, the components in the circuit may be as follows:

R1, R3, R12, R13, R21: 2.2K
R2, R4, R6, R7, R17, R37, R38: 1K
R8, R31, R35: 4.7K
R16, R18: 1.5K
R5, R9, R10, R11, R22, R23, R24, R25, R32, R33: 10K
R30: 22K
R14, R15, R19, R20, R27, R28: 47K
R26, R29, R34: 100K
R36: 68K

VR1, VR2, VR4: 5K VR3: 1K
Z1, Z2, Z3, Z4: type BZY 88
D5, D6, D7, D8, D9, D10, D11, D12, D13, D14: type IS923
C1, C2: 100 uF, 15 V (working)
C3, C4: 0.1 uF
C5: 1 uF
I.C.'s: type RC4558

It will also be appreciated that it may be necessary to sum more than two speed signals at the input to the circuit, for example, in which case more than two input channels having amplifiers "A" would be provided. In some cases one or more of the signals may be supplied from a remotely sited piece of equipment, operating from an independent supply and in this case the circuitry diagrammatically illustrated in FIG. 3 or FIG. 4 may advantageously be employed to provide a suitable isolated signal.

Figure 3:
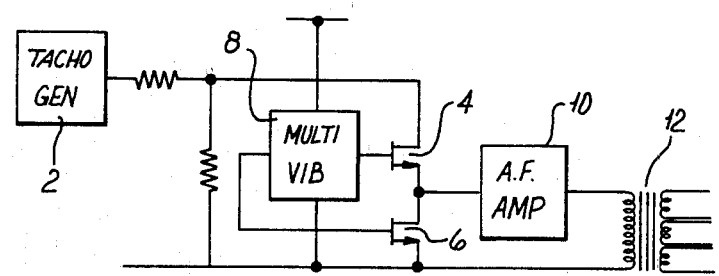
FIG. 3 is a schematic circuit diagram of a first type of control signal distribution system.

If it is unnecessary to detect change of direction of the conveyor supplying the input signal, the arrangement of FIG. 3 may be utilised. This includes a speed signal generator 2—which may for example be a simple tacho-generator giving a d.c. output signal whose level is proportional to input speed. This output is supplied to a chopper circuit comprising a pair of F.E.T.'s 4 and 6 and a multi-vibrator 8 which preferably operates at about 1 Khz. The resulting a.c. signal is amplified in a simply audio-frequency amplifier 10 to any required power level (a wide choice of such amplifiers being available) to drive the primary of a transformer 12. A number of completely isolated secondaries can be provided, the input power being suitably tailored to whatever number of separate control circuits is to be driven by the secondaries, and each control circuit having a suitable rectifier at its input.

Figure 4:
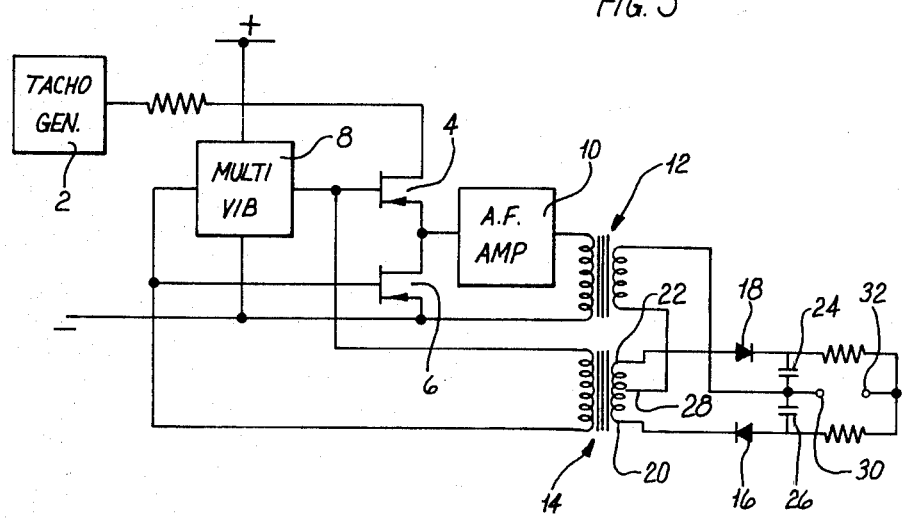
FIG. 4 is a circuit diagram of a second type of distribution system.

If it is necessary, in addition to detect a change of direction of a conveyor supplying the input signal, the circuit of FIG. 4 may be utilised. This includes a tacho-generator 2, F.E.T.'s 4 and 6, a multi-vibrator 8, and an amplifier 10 arranged in a similar circuit configuration to that of FIG. 3 so as to apply a modulated a.c. control signal to the primary of a transformer 12. The output from the multi-vibrator, i.e. the unmodulated "carrier wave" is also applied to the primary of a second transformer 14. This second transformer has a pair of diodes 16 and 18 connected in series with its secondary terminals 20 and 22 respectively, the diodes being connected together by a pair of capacitors 24, 26. The secondary of the transformer 12 is connected between a centre-tap 28 of the secondary of transformer 14, and the junction of the capacitors 24, 26. The effect of this arrangement is that when the signal applied to the transformer 14, the capacitor 26 will be charged via diode 16 to a greater extent than capacitor 24 will be charged via diode 18. Thus the rectified output terminal 30 of the device will be more positive than output terminal 32. Coversely when the signal applied to transofrmer 12 is in anti-phase to that applied to transformer 14 the capacitor 24 will be charged preferentially so that the polarity of the output voltage across terminals 30, 32 will be reversed. It will be apparent that the magnitude of the output will also be proportional to the level of the modulated signal so that the output at terminals 30, 32 will represent the input from tacho-generator 2 both in magnitude and polarity.

Although the transformers 12 and 14 are shown as each having one secondary winding, it will be appreciated that in practice they may each be provided with a plurality of windings as in the case of the transformer of FIG. 3, so that a number of mutually isolated outputs can be obtained.

In some circumstances a tacho-generator alone may not provide sufficient information to enable accurate control to be achieved. For example, if the tacho-generator is linked to a cigarette making machine, and cigarettes are periodically rejected by an inspection device between the maker and the junction which is to be controlled, the signal provided by the tacho-generator will not be a true measure of the speed of delivery of cigarettes to the junction.

In order to overcome this difficulty, an additional detection device may be provided downstream of the inspection device, arranged to interrupt the tacho-generator signal when there is a gap in the stream of cigarettes, after a predetermined time delay. Alternatively the tacho-generator may be completely dispensed with and a detector device may be positioned downstream of the inspection device so as to produce a stream of pulses corresponding to the individual satisfactory cigarettes. These pulses are then fed to a frequency or pulse-rate-to-voltage converter to provide a suitable speed signal, so that when there is a gap in the flow the signal falls to zero.

Figure 5:
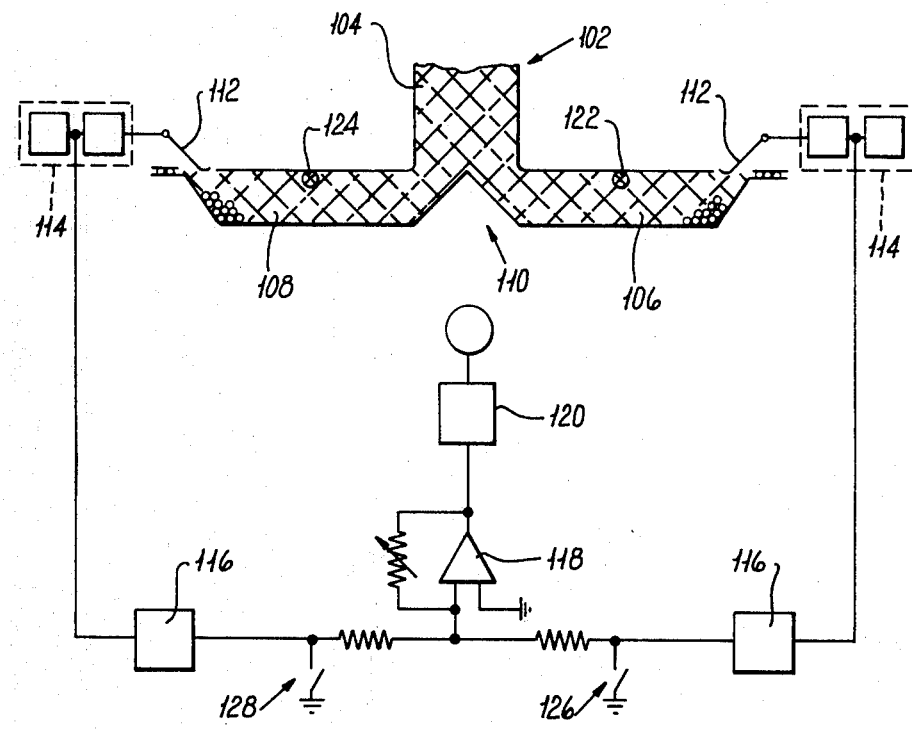
FIG. 5 is a diagrammatic drawing of a simplified control system.

The embodiment of FIG. 5 shows a system in which a "mass flow" elevator 102 which is adapted to carry a relatively wide flow 104 of cigarettes, is fed by conveyors 106 and 108. The junction 110 between the conveyor and the elevator may be of the kind shown in FIG. 6 or FIG. 7, which correspond to FIGS. 5 and 6 of out co-pending British application No. 52473/76. The arrangement of FIG. 6 allows stacks of cigarettes 150 and 151, which are carried by ribbed conveyors 152 and 153 from two separate cigarette making machines (not shown) to be merged at the lower end of the elevator.

As each stack approaches the elevator, it is driven by the corresponding band 152 or 153 and a cooperating pair of laterally spaced narrow bands 154 or 155 which pass around end portions of lower pulleys 156 and 157 for elevator bands 158 and 159.

After passing over stationary bridges 160 and 161, the two stacks of cigarettes are carried obliquely upwards in to a merger 170 between the lower ends of the elevator bands, by bands 162 and 163; one of these bands 162, 163 comprising a single wide band while the other comprises two laterally spaced narrow bands passing on opposite sides of the wide band. The bands 162, 163 pass around pulleys 164 and 165 adjacent to the bridges and around additional composite pulleys 166 and 167, these composite pulleys being formed in a number of parts which are relatively rotatable to allow the bands to move in the appropriate directions. Above the pulley 166 there is a fixed triangular cover 168 to prevent simultaneous contact of both bands with the cigarettes in that region and to assist in guiding the cigarettes obliquely upwards.

Figure 6:
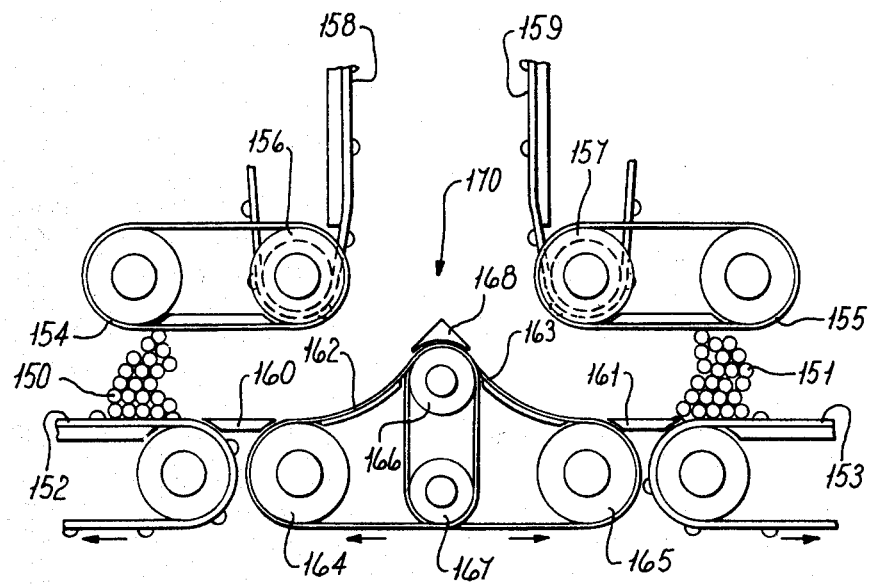
FIGS. 6 and 7 are enlarged details of alternative mechanisms for the FIG. 6 system.
Figure 7:
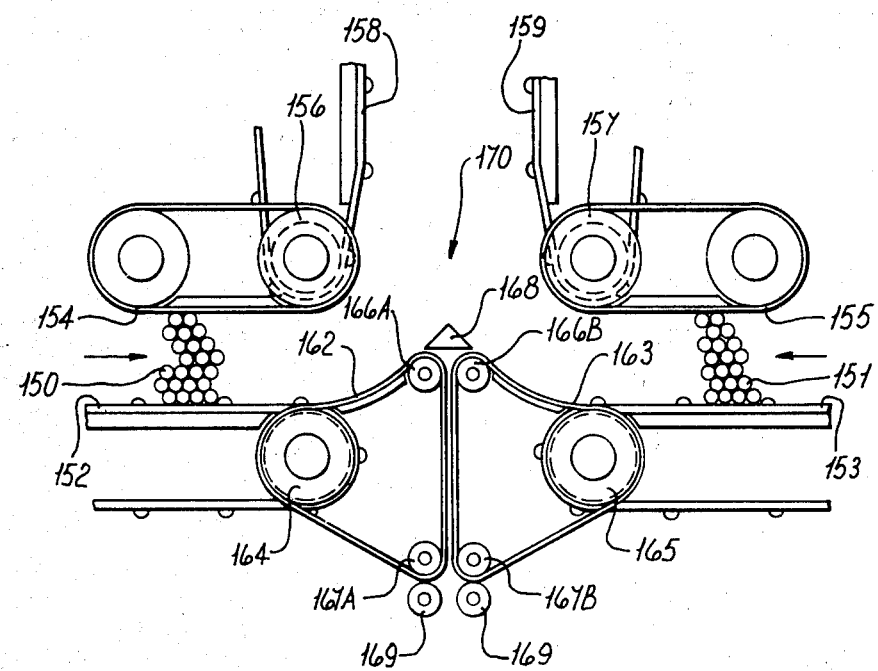

FIG. 7 shows a modification of the arrangement shown in FIG. 6. Similar reference numerals are used where possible. One difference is that the composite pulleys 166 and 167 are replaced by separate horizontally spaced pulleys 166A, 166B and 167A, 167B respectively. The bands 162 and 163 in this case each comprise a pair of laterally spaced narrow bands which pass around end portions of the pulleys 164 and 165 respectively on opposite sides of the bands 152, 153, which also return around the pulleys 164, 165. The bands 162 and 163 are driven respectively by the pulleys 167A and 167B with the aid of pinching rollers 169.

If the elevator is required to be emptied after each work period, this can be done by driving in reverse the elevator bands 158, 159 and at least one of the two sets of bands 152, 154, 162, or 153, 155, 163.

The conveyors 106 and 108 are each fed by a making machine (not shown) and the cigarettes issuing from the maker are formed into a stack at the input of the conveyor, in a known fashion. A transducer for monitoring the height of the stack comprises a pivoted sensor 112 resting on the top of the stack and connected to a "rotary inductive pick-off" i.e. a device in which a change of position of the sensor causes a corresponding change in the inductance of the device. This causes a corresponding change in the a.c. input to a conventional conveyor speed control circuit 14, such as that used on the Molins "OSCAR" reservoir device, and thus controls the speed of the corresponding conveyor 106 or 108.

Figure 8:
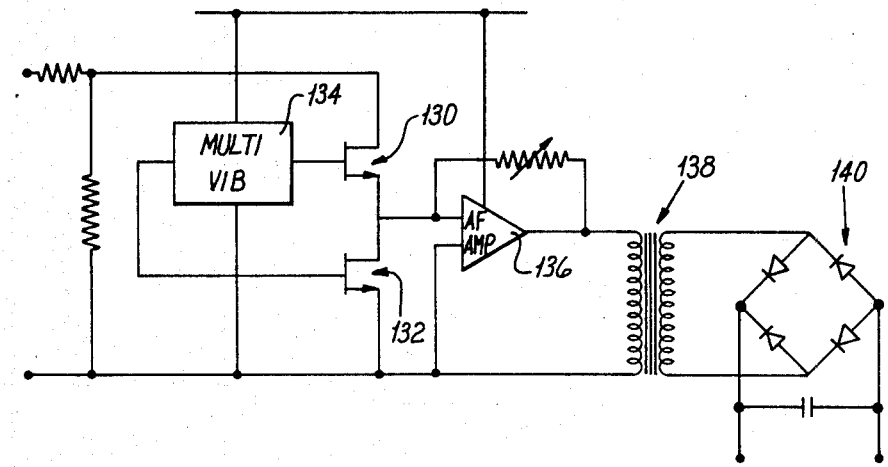
FIG. 8 is a circuit diagram of part of the control system of FIG. 6.

The output signal from each speed control circuit 114 is also supplied to an isolating buffer device, which provides mains isolation between the input and output and may be for example of the kind shown in FIG. 8. This comprises a chopper circuit including a pair of field effect transistors 130 and 132 and a multi-vibrator 134 which preferably operates at about 1 Khz. The resulting a.c. signal is amplified in a simple audio-frequency amplifier 136 to the required power level to drive the primary of a transformer 138, whose secondary is connected to a rectifier 140 which provides the output of the buffer device. Alternatively an opto-coupler device could be used. The output signals from the buffers 116 are connected to the inputs of a summing amplifier 118, whose output is supplied to a motor control box 120 for the elevator motor. Thus the speed of the elevator can be controlled in accordance with the sum of the inputs to the conveyors 106 and 108.

An open section of conveyor may be provided downstream of the input of each conveyor for inspection purposes, and thus voids or recesses in the flow may occur if the operator removes some cigarettes by hand. In order to ensure that the system takes account of such variations in the flow, stack detectors 122 and 124 respectively, which may comprise photo-electric cells, for example, are positioned between the inspection station of each conveyor 106 or 108 and the junction 110. These detectors actuate switches 126 or 128 respectively to connect the corresponding input of amplifier 118 to signal earth, if a void should occur in one of the conveyors, thus reducing the speed of the elevator 102.

We claim:

1. A control circuit for a conveyor in an article conveyor system including a junction at which the said conveyor meets at least one other conveyor, the said circuit comprising, means for producing a signal representing the net flow of articles towards or away from the junction on the at least one other conveyor; a sensor means including a sensor circuit arranged to produce a signal dependent upon the deviation of one of the number and level of articles in the junction from one of a desired number and desired level of articles; means for altering the sensitivity of the sensor circuit in accordance with the net flow signal, and means for controlling the motor of the said conveyor at a speed proportional to the sum of the net flow signal and the signal of the sensor circuit.

2. A control circuit as claimed in claim 1 further comprising means for comparing the output of the sensor circuit with a reference voltage range, and means for applying an additional correction signal to the motor if the output of the sensor circuit is outside the said range.

3. A control circuit as claimed in claim 2 further comprising means for setting the reference voltage range in accordance with the net flow signal.

4. A control circuit according to claim 1 in which the sensor circuit includes a potentiometer and the sensor means further includes a movable member engaging the articles and connected to a movable contact of the potentiometer, and in which the means for altering the sensitivity of the sensor circuit comprises means for applying a voltage proportional to the said net flow signal across the potentiometer.

5. A control circuit as claimed in claim 1 for a conveyor in an article conveyor system including a junction of at least three conveyors, in which the means for producing a signal representing the net flow of articles towards or away from the junction on the other conveyors comprises at least two inputs for flow signals representing flow towards or away from the junction, and a summing amplifier circuit for producing a sum of the said flow signals.

6. A control circuit as claimed in claim 4 in which the values of the upper and lower limits of the reference voltage range are established by means of a potential divider to which the voltage across the sensor potentiometer is applied.

7. A control circuit as claimed in claim 4 in which the net flow signal voltage is applied directly to one input of a diode bridge, and is also applied via an inverter to the other input of the bridge, and the sensor potentiometer is connected across the output terminals of the said bridge, so that the polarity of the voltage across the potentiometer is maintained constant regardless of the polarity of the net flow signal.

8. A control circuit as claimed in claim 7 further comprising biassing means connected to the outputs of the diode bridge so as to provide a bias voltage across the potentiometer when the net flow signal is less than the forward voltage drop of the diodes.

9. A control signal distribution system for the distribution of d.c. signals between a plurality of conveyor junction control circuits according to claim 1, the said distribution system comprising; an a.c. carrier signal source; a modulator for modulating the carrier signal with the d.c. signal; and isolating coupling means for connecting the modulated a.c. signal to the input of a demodulating circuit connected to the input of a conveyor control circuit.

10. A control signal distribution system as claimed in claim 9 in which the demodulator comprises a phase sensitive detector.

11. A conveyor system comprising a plurality of junction zones, each junction zone comprising at least one "upstream" and one "downstream" conveyor arranged to normally feed cigarettes respectively to or from the junction zone, one of which conveyors is to be controlled in accordance with the flow conditions; separate drive means connected to each of the conveyors; a sensor at each junction, responsive to one of the volume and pressure of cigarettes in the junction zone; means for altering the sensitivity of the sensor in accordance with net flow conditions; and control circuit means adapted to combine a signal representing the net flow of cigarettes at least at one of upstream and downstream of the junction on at least one of the other conveyors, with a correction signal from the sensor, to produce a control signal determining one of the speed and the speed and direction of the conveyor which is to be controlled.

* * * * *